Figure 1:
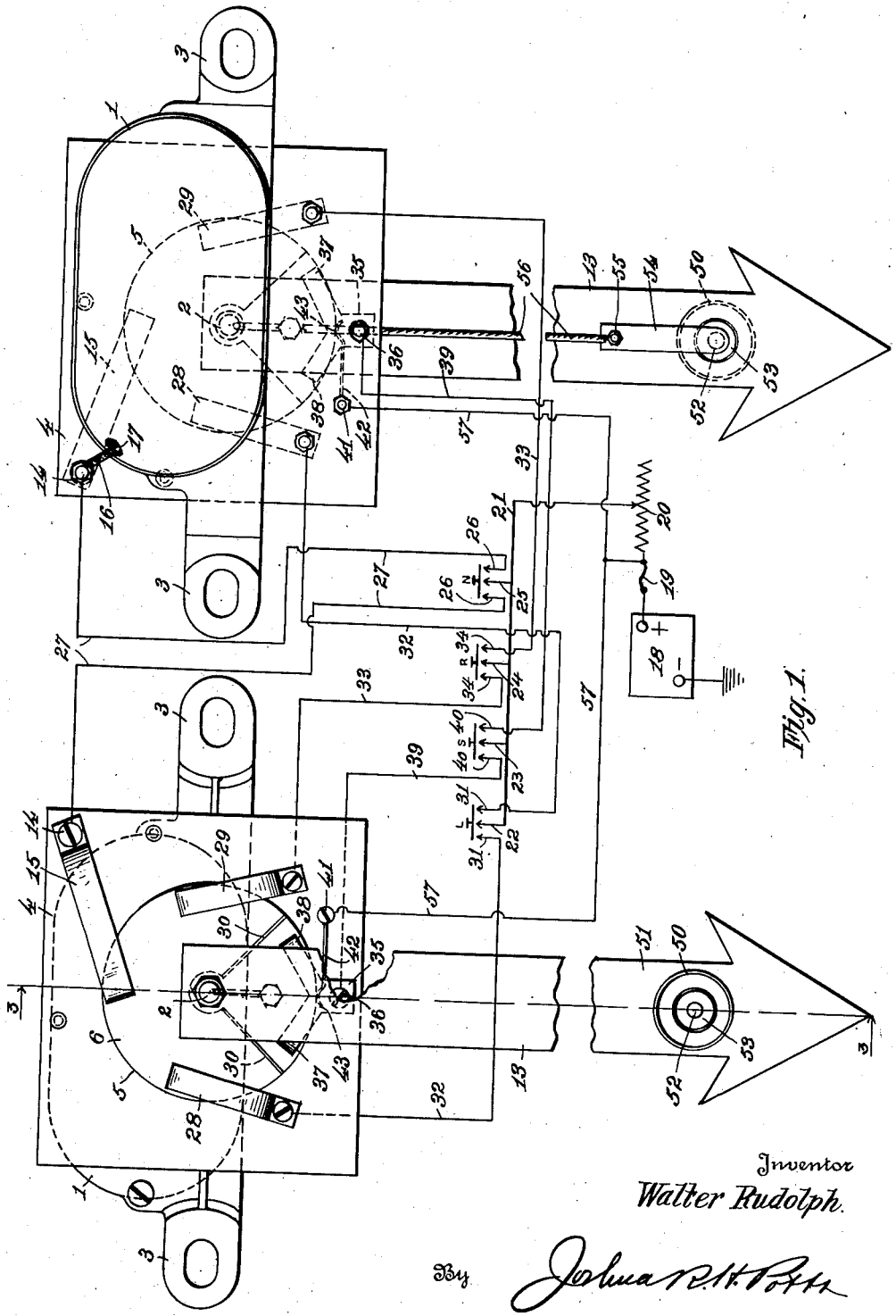

Nov. 23, 1943.   W. RUDOLPH   2,335,158
AUTOMOBILE SIGNAL
Filed Jan. 23, 1941   2 Sheets-Sheet 1

Inventor
Walter Rudolph.
By Joshua R. H. Potts
Attorney

Nov. 23, 1943.      W. RUDOLPH      2,335,158
AUTOMOBILE SIGNAL
Filed Jan. 23, 1941      2 Sheets-Sheet 2
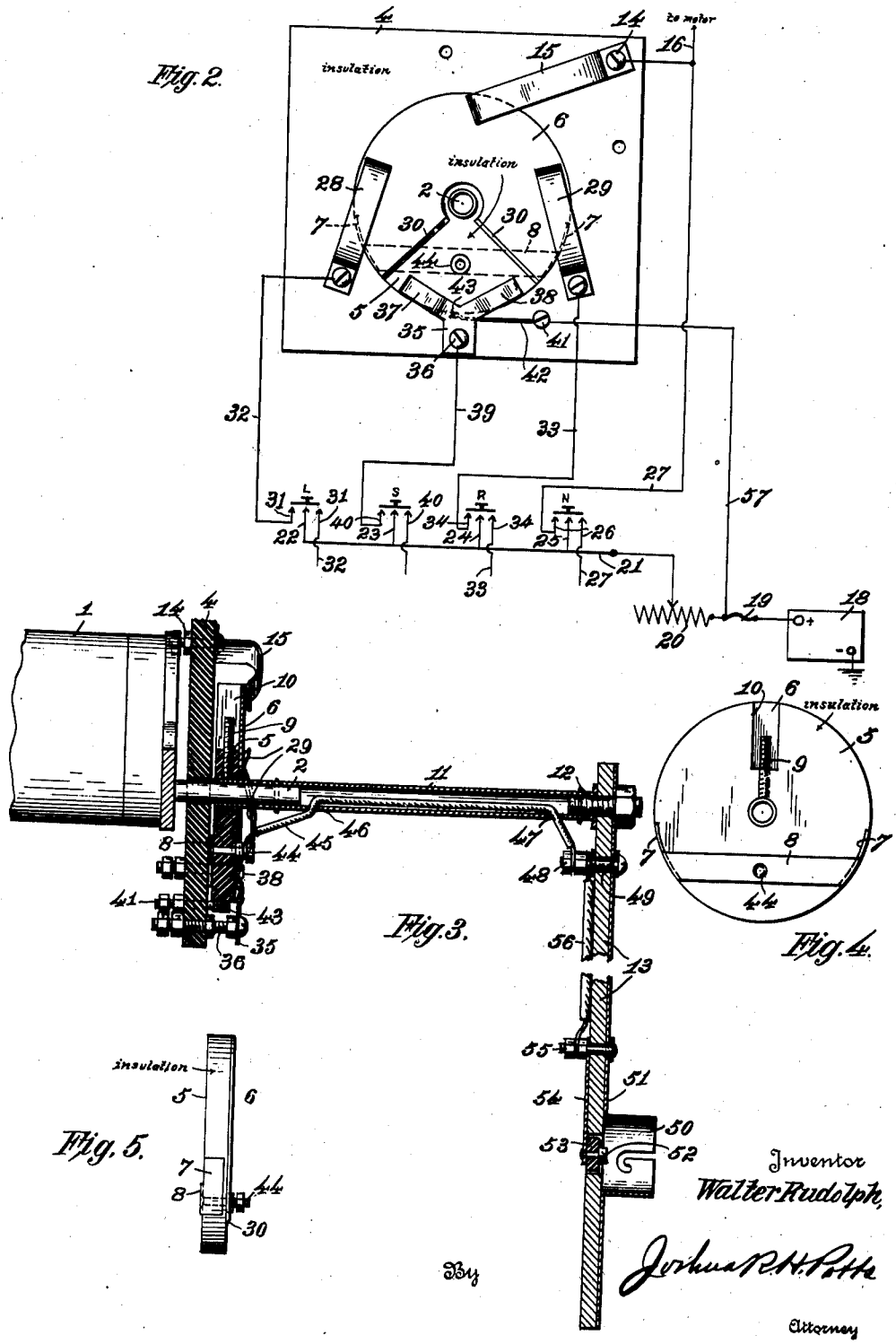

Patented Nov. 23, 1943

2,335,158

UNITED STATES PATENT OFFICE 2,335,158

AUTOMOBILE SIGNAL

Walter Rudolph, Stroudsburg, Pa.

Application January 23, 1941, Serial No. 375,691

3 Claims. (Cl. 177—327)

My invention relates to signals and particularly to electric signals adapted to be applied to automobiles whereby the drivers thereof may readily signal to drivers in other cars and to pedestrians, his intentions as to the operation of the car he is driving.

The object of my invention is to provide a signaling device of the character mentioned by means of which the driver may quickly, and without interference to the normal operation of the car, give suitable signals, indicating his intentions to turn right or left or to stop the car he is driving. A further object of the invention is to provide a device of the character mentioned whereby a notice may be given to the drivers of the following cars that conditions exist ahead which may require sudden action on the part of the driver. A further object of my invention is to provide a device of the character mentioned which may be applied to practically any automobile, and so arranged that the driver may at all times see that the device is properly operating without interfering with proper and continuous watching of the traffic.

More specifically the present invention relates to improvements in my invention covered by Patent No. 2,190,124, dated February 13, 1940; and the specific objects are to provide a signal device characterized as above stated, but which shall be of more simple construction, much cheaper to manufacture and install, and which at the same time will serve as efficiently in displaying the several signals. Other objects will appear hereinafter.

In carrying out my invention I provide a swinging arm or pointer upon the rear of the automobile to indicate the intention of the driver as to his intended operation of the car as to turning or stopping. This arm is mounted upon an oscillatory motor-driven shaft which projects through the rear wall of the car. Preferably I arrange this oscillatory shaft above the approximate center of the rear window of the car so that the signaling arm may be visible at all times to the driver who may readily see the same through the rear-view mirror arranged at the top of the windshield, the signal arm depending from said shaft and swinging across the rear window, as is obvious without illustration. I also prefer to provide a similar device at the front of the vehicle to be visible to persons in front of the car, either to those traveling in the opposite direction, or transversely at crossings. As the mechanisms at both front and back of the car are identical, a detailed description of one will be sufficient, except when referring to the combination as a whole and in relation to the electrical connections from the two devices to the signal operating switches.

The shaft may be operated by any perfected means, but I have found that I can adapt the motor of a windshield wiper to this use, fixing the signal arm and a circuit control device to the oscillatory shaft thereof; I have illustrated the mechanisms as including two such windshield wiper motor casings and their respective oscillatory shafts.

At the front of the car, in a position convenient to the driver, is a circuit closing device preferably comprising four three-point push-button switches with one point of each connected to a common bus bar which in turn is connected to the battery. These switches are provided with indicia on or adjacent the same to indicate respectively "left," "stop," "right," and "notice," and the other two points of each switch are connected respectively to the similar elements of the two circuit controlling devices. Upon pressing the switch button indicating right or left turn, the signal arm will be swung to the right or left accordingly, and stop in that position, the lamp on the signal arm being illuminated as it reaches the signaling position. When the switch indicating "stop" is pressed the arm will swing to a vertical position, at which time it is not necessary to light the lamp on the signal arm as the usual stop light is lit upon actuation of the brake. Should the driver of the car notice ahead changing traffic conditions which would require unusual precaution, he presses the switch button indicating "notice" which will cause the signal arm to oscillate and at the same time blink the light carried thereby.

The circuit making and breaking device above mentioned includes an oscillatory segmental contact member fixed to the oscillatory motor driven shaft and movable therewith. A contact member connected to a source of electric supply is in constant contact with the oscillatory contact member, and suitable fixed contacts are arranged adjacent the ends of said oscillatory contact, some of which are in contact therewith only at the end of each movement and others during part of the movement so that when the switch is actuated to give a certain signal, "right," "left," or "stop," the circuit to the motor is closed, but as soon as the signal arm, and with it the oscillatory contact reaches a desired position, the circuit is broken and the motor stopped; and the signal can be restored to normal position only upon actuation of the switch designated "stop." When the switch button indicating "notice" is pressed the circuit to the motor is constant and not broken upon the oscillation of the contact, so that the signal is constantly oscillated and the lamp on the swinging signal arm is illuminated during the period of approach to and recession from the limit of movement in each direction, thereby "blinking" the light.

My invention further comprises various combinations and arrangements of parts all as will be fully described hereinafter and particularly pointed out in the claims.

My invention will be more readily understood by reference to the accompanying drawings forming a part of this specification and in which—

Fig. 1 is a diagram of a signal device embodying my invention and illustrating both the front and rear signaling elements and the circuits in connection therewith, Fig. 2 is a similar view more in deail of one of the signaling elements, Fig. 3 is a section on the line 3—3 of Fig. 1, Fig. 4 is a rear elevation of the oscillatory make and break device, and Fig. 5 is an edge elevation of the same.

Referring to the drawings, 1 indicates a motor casing and 2 a shaft oscillated by a motor therein. As above stated I have found the motor of a windshield wiper highly efficient for this purpose, and have so illustrated it in the drawings. The motor casing is provided with the usual apertured lugs 3 to facilitate securing the same in position. Secured to the open face of the casing or housing 1 is a plate 4 formed of a sheet of insulating material and so arranged that the oscillatory shaft extends through the same at approximately the center thereof. Fixed to the shaft 2 and in close proximity to the outer face of the plate 4 is the circuit controlling device. This consists of a disc 5 formed of insulating material, upon the outer face of which is secured a segmental contact plate 6 and a pair of peripheral contact members 7 which are spaced apart but connected across the back of the disc 5 by a strip 8 of conducting material. The circuit controlling device thus formed is rigidly fixed to the shaft 2 so as to oscillate therewith. This may be done in any preferred manner, as by a setscrew 9, to accommodate which, the disc 5 may be cut away or recessed as indicated at 10.

Fixed to the oscillatory shaft 2, and forming an extension thereof is a tubular shaft section 11 which projects through the front or rear wall of the car, as the case may be, and into the outer end of which is fixed a terminal section 12. Fixed to the terminal section 12, and preferably depending therefrom, is the signaling arm 13.

Fixed to the plate 4, as by binding post 14 is a spring arm 15, the free end of which is in constant engagement with the segmental contact plate 6. Extending from the binding post 14 to the motor (not shown) is a suitable conductor 16, 17 indicating an aperture in the casing 1 for said conductor.

18 indicates the battery which is connected through a fuse 19 and rheostat 20 to a bus bar 21 to which are connected four fixed contact points 22, 23, 24 and 25, for switches indicating "left," "stop," "right," and "notice," respectfully. Associated with the contact 25 are a pair of contact points 26 which are connected respectively to the binding posts 14 of the front and rear signaling devices respectively, by conductors 27.

Also fixed to the plate 4 are spring arms 28 and 29 respectively, the free ends thereof engaging the plate 6 in such a position that the ends of the segmental plate will pass beyond the same at the limit of its movement in each direction, respectively. The plate 6 is formed with substantially radial edges 30 which are beveled as indicated to facilitate the passage of the plate under the free ends of the contact arms 28 and 29. To further facilitate this free movement in making and breaking of the contact at these points, said arms 28 and 29 are preferably arranged in a line tangential to the path of movement of the disc at the point of contact. The spring arm 28 of the front and rear signals are connected respectively to contact points 31 respectively associated with the contact point 22, as by conductors 32. The contact arms 29 are similarly connected through conductors 33 to contacts 34 respectively associated with the switch point 24.

A contact member 35 is mounted upon the plate 4 by the binding post 36 and includes a pair of spring contact arms 37 and 38 respectively, the free ends of which normally rest upon the disc 5 at points removed from the edges of the segmental plate 6, as clearly shown in Figures 1 and 2 of the drawings. These arms also extend substantially tangential to the movement of the disc at their points of contact to facilitate engagement with and disengagement from the segmental plate. These contact members 35 are connected by conductors 39 to switch points 40 associated with the switch point 23.

Mounted on the plate 4, as by post 41, is a spring contact arm 42 the end 43 of which engages the periphery of the disc 5. As the disc oscillates, the contact members 7 will alternately engage the contact 42. A binding post 44 extends through the disc 5 and has one end in engagement with the conductor 8 which connects the contacts 7. To the outer end of the post 44 is connected a wire conductor 45. This extends through an aperture 46 in the tubular section 11 of the shaft and extends substantially the length thereof to an aperture 47 through which it extends and is connected to a binding post 48 on the signal arm 13 from which it is insulated as indicated at 49. 50 indicates a lamp socket adjacent the free end of the signal arm and fixed to a conductor plate 51 on the outer face of the arm. The center contact 52 of the lamp socket is mounted upon a disc 53 of insulating material and this disc is mounted on a spring arm 54. One end of the arm 54 is secured, as by a binding post 55, to the arm 13, said binding post being insulated from the plate 51. A conductor 56 connects the binding posts 48 and 55. By this arrangement, when the contacts 7 engage the spring contact 42 the lamp in the socket 50 is illuminated. The circuit is completed to the lamp through a conductor 57 which is connected to the battery between its terminal and the rheostat 20. By this arrangement the lamp is always supplied with the full voltage from the battery even when the current to the motor is reduced by the rheostat to control the speed of the motor and signal arm.

The operation of the device is as follows:

As the signals at front and rear of the car are similar a description of one will suffice. Should the driver of the car desire to make a left turn he presses the switch button denominated "L" or "left." The current then passes from the battery through the rheostat and bus bar 21 to the switch point 22, and thence through conductors 32 to the spring arms 28 which are in engagement with the segmental discs 6, thence through the contact arm 15 to the motors, thereby starting the same into operation. The shaft 2 will then be oscillated until the edge 30 of the contact plate 6 adjacent the arm 28 passes beneath said arm and out of contact therewith as indicated in dotted lines in Fig. 2. This breaks the circuit to the motor and consequently stops the same. This movement of the shaft throws the indicating arm 13 to the left, signaling that a left turn is to be made. At the same time, one of the contact plates 7 on the periphery of the disc 5 engages the spring contact arm 41 thereby closing the circuit to the lamp as hereinbefore described. This movement of the segmental plate 6 has brought the same into engagement with the contact arm 38 so that the signal arm can be restored to normal vertical position by pressing the switch button designated "S" or "stop." It is not necessary to illuminate the lamp on the signal arm at this time, as the usual stop light required on automobiles is illuminated whenever the brake lever is depressed. When a right hand turn is to be made the switch button designated "R" or "right" is depressed and the current passes through 33 to the arm 29 thence through plate 6 and arm 15 to the motor causing the shaft to oscillate and come to a rest when the adjacent edge 30 of the plate 6 passes from under the arm 29. This movement also illuminates the lamp and also brings the contact arm 37 into engagement with the plate so that the arm can be restored to normal position by again pressing the "stop" button.

Should changing traffic conditions make it impossible for the driver to decide whether to stop, turn left or turn right he serves notice to the following car or cars of such conditions by depressing the switch button designated as "N" or "notice." When this is done the current passes directly from 25 through 27 to the post 14 and thence to the motor and as there is no means provided for automatically breaking this circuit, the signal arm will continue to oscillate while the "notice" switch button is depressed. At such time the contacts 7 come into engagement with the contact 41 as the signal arm approaches and leaves the limit of its movement thereby producing a blinking of the lamp in the socket 50.

The device as above described is simple in structure and of low cost to manufacture so that it may be produced and sold on the market at a comparatively low price.

I claim:

1. In a signal device for motor cars, an oscillatory motor driven shaft, a signal arm thereon to indicate intended change in movement of the car, a source of electric supply a plurality of switches adjacent the driver's seat for closing the circuit to the motor, said switches each having a contact connected to said source of supply, and contact points indicating "right," "left," "stop," and "notice," a segmental contact member fixed to said oscillatory shaft for selectively controlling the circuit to the motor, a pair of fixed contact members adapted to normally engage the oscillatory contact member but disengage therefrom respectively at the opposite limits of movement of the oscillatory contact, conductors connecting said fixed contact members with contact points of the switch indicating "right" and "left" respectively, a second pair of fixed contact members at opposite ends of the oscillatory member adapted to be engaged by oscillatory member only at the end of the movement of the latter, the last said contacts being together connected to the contact of the switch indicating "stop," and a fixed contact arm in permanent engagement with the segmental contact and in circuit with the motor and a conductor from said fixed contact arm to the switch indicating "notice" and to the motor.

2. In a signal device for motor cars, an oscillatory motor driven shaft, a signal arm thereon to indicate intended change in movement of the car, a source of electric supply, a plurality of switches adjacent the driver's seat for closing the circuit to the motor, each of said switches having a contact connected to a source of supply and contact points indicating respectively "right," "left," "stop," and "notice," a circuit controlling device fixed to said shaft to oscillate therewith and comprising a disc of insulating material, a segmental conductor plate fixed to one face thereof and a pair of spaced electrically connected contacts on the periphery of said disc, a pair of fixed contact members adapted to normally engage the segmental plate but disengage therefrom respectively at the opposite limits of movements of said plate, conductors connecting said fixed contact members with contact points of the switches indicating "right" and "left" respectively, a second pair of fixed contact members at opposite ends of the segmental plate adapted to be engaged by the same only at the end of the movement of the latter the last said fixed contacts being together connected to the contact of the switch indicating "stop," and a fixed arm in permanent engagement with the oscillating segmental conductor plate and in circuit with the motor, and a conductor from said contact arm to the switch indicating "notice" and to the motor.

3. In a signal device for motor cars, an oscillatory motor driven shaft, a signal arm thereon to indicate intended change in movement of the car, a lamp on said arm, a source of electric supply, a plurality of switches adjacent the driver's seat for closing the circuit to the motor each having a contact connected to the source of electric supply and contact points indicating "right," "left," "stop," and "notice," respectively, a fuse and rheostat interposed between the source of supply and the first mentioned contacts of the switches, a segmental contact member fixed to said oscillatory shaft for selectively controlling the circuit to the motor, a pair of fixed contact members adapted to normally engage the oscillatory contact member but disengage therefrom respectively at the opposite limits of movement of the oscillatory contact, conductors connecting said fixed contact members with contact points of the switch indicating "right" and "left" respectively, a second pair of fixed contact members at the opposite ends of the oscillatory segmental member adapted to be engaged by said member only at the end of the movement of the latter, the last said fixed contacts being together connected to a contact of the switch indicating "stop," a fixed contact arm in permanent engagement with the oscillatory contact and in circuit with the motor, a conductor from said fixed contact arm to the switch indicating "notice" and to the motor, a pair of contacts on the periphery of said oscillatory member and electrically connected to the lamp on the signal arm, a contact member adapted to be engaged alternately by said peripherally arranged contacts as the device is oscillated and a connection between said fixed contact and the source of supply between the same and the rheostat, substantially as described.

WALTER RUDOLPH.